United States Patent [19]

Kennedy et al.

[11] Patent Number: 5,484,653
[45] Date of Patent: Jan. 16, 1996

[54] FIRE RESISTANT MAT

[75] Inventors: Thomas D. Kennedy, Gresham; Michael O. Malarkey, Scappoose, both of Oreg.; Larry R. Graves, Puyallup, Wash.

[73] Assignee: Herbert Malarkey Roofing Company, Portland, Oreg.

[21] Appl. No.: 224,139

[22] Filed: Apr. 6, 1994

Related U.S. Application Data

[63] Continuation of Ser. No. 905,116, Jun. 26, 1992, Pat. No. 5,308,692.

[51] Int. Cl.⁶ .................................................. B32B 27/00
[52] U.S. Cl. ........................ 428/290; 428/288; 428/921
[58] Field of Search ................................ 428/288, 290, 428/921

[56] References Cited

U.S. PATENT DOCUMENTS

| | | | |
|---|---|---|---|
| 2,728,972 | 12/1955 | Drummond et al. | 65/3.4 |
| 2,886,466 | 5/1959 | Iler et al. | 428/338 |
| 3,007,878 | 11/1961 | Alexander et al. | 252/313.2 |
| 3,025,588 | 3/1962 | Eilerman | 28/166 |
| 3,077,413 | 2/1963 | Campbell | 106/38.9 |
| 3,215,585 | 11/1965 | Kneipple | 65/3.43 |
| 3,252,917 | 5/1966 | Mindick et al. | 252/313.2 |
| 3,292,013 | 12/1966 | Golahny | 307/493 |
| 3,470,977 | 10/1969 | Shannon | 181/284 |
| 3,616,713 | 11/1971 | Crouch | 81/57.4 |
| 3,620,978 | 11/1971 | Moore, Jr. | 252/43 |
| 3,684,467 | 8/1972 | Smucker et al. | 65/3.43 |
| 3,687,850 | 8/1972 | Gagin | 162/156 |
| 3,689,300 | 9/1972 | Bunger et al. | 106/287.1 |
| 3,719,607 | 3/1973 | Moore, Jr. | 252/313.2 |
| 3,804,706 | 4/1974 | Karashige et al. | 162/109 |
| 3,869,263 | 3/1975 | Greenspan | 51/209 R |
| 3,896,081 | 7/1975 | Baxter et al. | 525/509 |
| 3,956,171 | 5/1976 | Moore, Jr. | 252/313.2 |
| 3,996,032 | 12/1976 | McWilliams et al. | 65/3 C |
| 4,006,272 | 2/1977 | Sakaguchi et al. | 428/268 |
| 4,014,726 | 3/1977 | Fargo | 156/167 |
| 4,043,779 | 8/1977 | Schaefer | 65/2 |
| 4,045,196 | 8/1977 | Schaefer | 65/2 |
| 4,129,674 | 12/1978 | Hannes et al. | 428/285 |
| 4,158,555 | 6/1979 | Kallenborn | 65/2 |
| 4,169,914 | 10/1979 | Gallacher | 428/290 |
| 4,220,500 | 9/1980 | Baba et al. | 162/127 |
| 4,255,483 | 3/1981 | Byrd et al. | 428/245 |
| 4,255,485 | 3/1981 | Yau | 428/388 |
| 4,258,098 | 3/1981 | Bondoc et al. | 482/288 |
| 4,278,551 | 7/1981 | Hou et al. | 210/767 |
| 4,341,668 | 7/1982 | Martin et al. | 524/297 |
| 4,370,169 | 1/1983 | Graham | 106/267 |
| 4,381,199 | 4/1983 | Graham | 106/186 |
| 4,447,490 | 5/1984 | Ventker et al. | 428/285 |
| 4,457,785 | 7/1984 | Hsu et al. | 106/308 N |
| 4,457,969 | 7/1984 | Biale | 428/288 |
| 4,506,060 | 3/1985 | White, Sr. et al. | 525/163 |
| 4,522,958 | 6/1985 | Das et al. | 523/212 |
| 4,532,006 | 7/1985 | Winters et al. | 162/3 |
| 4,536,446 | 8/1985 | Hsu et al. | 428/392 |
| 4,542,068 | 9/1985 | Whichard | 428/290 |
| 4,592,859 | 6/1986 | Smith-Johannsen | 252/309 |
| 4,609,709 | 9/1986 | Yau | 525/164 |
| 4,637,951 | 1/1987 | Gill et al. | 428/215 |
| 4,647,946 | 3/1987 | Lehnert et al. | 428/251 |
| 4,654,100 | 3/1987 | Yats et al. | 156/246 |
| 4,681,658 | 7/1987 | Hsu et al. | 162/156 |
| 4,794,051 | 12/1988 | Gupta | 428/524 |
| 4,810,569 | 3/1989 | Lehnert et al. | 428/285 |
| 4,811,538 | 3/1989 | Lehnert et al. | 52/455 |
| 4,917,764 | 4/1990 | Lalwani et al. | 162/156 |
| 5,030,496 | 7/1991 | McGurran | 428/85 |

FOREIGN PATENT DOCUMENTS 480316  7/1937  United Kingdom .

OTHER PUBLICATIONS

Koenig, *Processed Mineral Fiber in Mats and Papers*, Nonwovens, p. 133 (1984).
"Advance Technical Data Sheet" by Nalco Chemical Company, (Apr. 1987).
"Material Safety Data Sheet" for Latex DL249NA by Dow Chemical USA (Jun. 7, 1990).
"Ethylene Vinyl Chloride Latex," by Air Products and Chemicals, Inc. (1977).
"Airflex 4514 Developmental Properties," by Air Products and Chemicals, Inc. (1977).
"Good-Rite® Latex Hycar® Latex Geon® Latex Technical Data Geon® 460X58" by B. F. Goodrich Chemical Group (Jan. 1987).
"Good-rite® Latex Hycar® Latex Geon® Latex Technical Data Geon® 460X63" by B. F. Goodrich Chemical Group (Jan. 1987).
"Good-rite® Latex Hycar® Latex Geon® Latex MSDS No. 5, Material Safety Data Sheet Geon® Latex" by B. F. Goodrich Chemical Group, Doc. 85152 (Aug. 24, 1988).
"The Colloidal State," *Nalco IPC Service Manual*, Section 1, (Jul. 1978).
"Nalco," William D. McMillan, (1987).
"Urea-Formaldehyde Concentrate UFC" by Georgia-Pacific Resin Division, (1984).
"Typical Economies Effected by Using U.F. Concentrate-85 in Place of Aqueous Formaldehyde," pp. 6, 9–11.

Primary Examiner—Christopher W. Raimond
Attorney, Agent, or Firm—Klarquist Sparkman Campbell Leigh & Whinston

[57] ABSTRACT

A non-woven fiber mat for use as a backing material for various components used in the building industry, and having improved fire resistant qualities. The mat comprises a blend of mineral fibers and glass fibers bonded together with a fire resistant binder system. The binder system comprises a mixture of a fire resistant latex and an aqueous aldehyde condensation polymer-based thermosetting resin. The preferred weight ratio of the latex to the aldehyde condensation polymer is at least 1:1 on a non-volatile basis. The binder may optionally further contain an aqueous silica colloid.

22 Claims, No Drawings

FIRE RESISTANT MAT

This is a continuation of application Ser. No. 07/905,116, filed Jun. 26, 1992 now U.S. Pat. No. 5,308,692.

TECHNICAL FIELD

This invention relates to fiber mats for use as a fire resistant underlayment or facing for materials used in the building and construction industries.

BACKGROUND INFORMATION

Non-woven fiber mats are utilized in numerous applications in the construction industries. Examples include fiber mat-faced gypsum board which is used as a structural support and insulating layer; insulating material for buildings, pipes, and machinery; sound insulation material; filters; backing material for roofing products; and, fire resistant backing sheets for materials such as doors, carpets and fabrics.

Non-woven fiber mats, including the mat of the present invention, are typically manufactured by a process known as the "wet" process. This process is well known in the art, and is typified by the disclosure in U.S. Pat. No. 4,129,674.

A typical wet process may be briefly summarized as follows: fibers of predetermined diameter and length are dispersed in an aqueous slurry through a combination of mechanical agitation and chemical dispersants. A continuous fine mesh conveyor, known in the industry as a forming wire, passes through the slurry and is thereby coated with an even, continuous layer of fibers. The fibers are randomly deposited on the wire, forming a non-woven web or membrane. Most of the water passes through the wire. Excess water is removed from the mat by conventional methods, typically vacuums. The membrane is transferred to a second screen conveyer for conveyance through a section of the processing line where it is saturated with a chemical binder. The binder-saturated membrane is then passed through an oven, which sets the binder and evaporates most of the remaining water. This results in the formation a continuous dry mat. The mat is then wound upon a spool for further processing. There are, of course, many modifications to this typical procedure.

Both organic and inorganic fibers are commonly used in fiber mats. Organic fibers such as those made from cellulosics, acrylic, nylon, polyester, and polypropylene are typical. Inorganic fibers such as glass and mineral wool are also used. Glass fibers consist primarily of oxides of silicon, with other mineral oxides present at relatively lower percentages. Mineral wool fibers are typically manufactured from various waste slags such as copper refinery slag, and are therefore very economical to use. They consist of oxides of silicon, aluminum, calcium, and magnesium, and other mineral oxides.

Fibers of varying sizes may be blended together to form the mat. By varying the length and diameter of the fibers the structural properties of the finished product may be altered. For example, fiber with larger dimensions would tend to give the finished mat an abrasive hand or feel.

Fiber mats which utilize a blend of fibers of varying sizes are known in the art. For example, in U.S. Pat. No. 4,637,951 to Gill et al., a fiber mat that uses a blend of "base" fibers and "microfibers" is disclosed. Both are monofilament glass fibers, but the microfibers are smaller in both length and diameter than the base fibers. The resulting mat is said to be more porous than mats produced by previously known methods, and is thus better suited for use as a substrate for subsequently applied coatings such as a vinyl flooring. Similarly, U.S. Pat. No. 4,129,674 to Hannes et al., discloses a wet process fiber mat which utilizes two different sizes of glass fibers. The Hannes mat is formed by combining monofilament glass fibers with elongated glass fiber bundles. The fiber bundles reinforce the mat and improve tear resistance. The mat is suitable for use in the manufacture of roofing materials.

It is also known that mineral wool may be partially or wholly substituted for glass wool in a blended mat. Fiber mats containing up to twenty-five percent mineral wool and seventy-five percent glass wool are described in an article written by Koenig, and entitled "Processed Mineral Fiber in Mats and Papers," (1984 Nonwovens, pg. 133). And U.S. Pat. No. 4,532,006 to Winters et al., discloses a wet process fiber mat wherein the percentage of the mineral wool fibers and glass fibers may be varied up to 100 percent of the other.

Non-woven fiber mats may be utilized as fire resistant backing sheets for materials such as doors, carpets or vinyl fabrics. The relative degree of fire resistance provided by fiber mats depends upon numerous factors, including the size and composition of the fibers, and the composition of the binder. However, these factors also contribute to the functional properties of the mat. Thus, in developing a fire resistant mat the desired functional properties must be considered in addition to the degree of fire resistance.

Moreover, compliance with various fire resistance testing methods is an important consideration in developing such fire resistant mats because many regulatory agencies and building codes rely on these tests in determining the acceptance of building materials used in various applications. Insurance rates may also be affected by compliance with fire resistance testing methods. One of the most widely accepted classifications for fire resistance is found in the National Fire Protection Association (NFPA) Life Safety Code 101. This code scores fire resistance of materials according to a flame spread index (FSI), and classifies flame resistance from Class A through Class E. Materials obtaining a Class A rating are the most fire resistant. Specific procedures for testing the fire resistance of materials are found in the American Society for Testing and Materials (A.S.T.M.) Standard Test Method for Surface Burning Characteristics of Building Materials, A.S.T.M. E 84–87a. Essentially the same test is also described by other schemes, such as NFPA 255, and American National Standards Institute (ANSI) 2.5.

In a non-woven fiber mat that is used as a fire resistant backing it is desirable to obtain the optimum level of fire resistance without sacrificing the functional properties of the mat. One of the primary objectives of the present invention is to provide a non-woven fiber mat which utilizes a blend of mineral wool and glass wool fibers bonded together with a fire resistant binder. The resulting mat has improved fire resistant qualities and optimal functional properties.

SUMMARY OF THE INVENTION

This invention is directed toward a non-woven fiber mat having improved fire resistant qualities and which may be used as a backing material for various components used in the building industry. The mat comprises a blend of mineral fibers and glass fibers wherein the mineral fibers comprise between 50 and 95 weight percent of the blend of fibers. The fibers are bonded together with a fire resistant binder system which comprises a stable mixture of a fire resistant latex, and an aqueous aldehyde condensation polymer-based thermosetting resin. In the preferred embodiment the latex is preferably a halogenated latex polymer, more preferably carboxylated, and the aldehyde condensation polymer is a modified urea-formaldehyde condensate thermosetting resin, wherein the modified urea-aldehyde condensate is prepared by reacting during the condensation reaction with ammonia or a primary polyamine, wherein the ammonia may be aqueous ammonia or anhydrous ammonia and the polyamine is preferably an alkyl primary diamine, more preferably a $C_1$-$C_6$ alkyl primary diamine. The preferred weight ratio of the latex to the aldehyde condensation polymer is at least 1:1 on a non-volatile weight basis. This embodiment of the binder composition of the present invention surprisingly and synergistically enhances the flame resistance of fibrous mats containing the cured binder composition.

The preferred binder optionally further comprises an effective amount of an aqueous silica colloid. The effective amount of the silica colloid is an amount sufficient to enhance the flame resistant property of the binder composition after curing and yet remain compatible with the other components of the binder composition prior to curing. The effective amount of the silica colloid preferably ranges from about 0.1 percent to about 10 percent by weight of the resin, more preferably from about 0.1 percent to about 5 percent by weight, non-volatile basis. Preferably, the silica colloid is a cationic silica colloid.

The binder composition of the present invention preferably contains from about 5 to about 50 percent of the aldehyde condensation polymer-based resin and correspondingly about 50 to about 95 percent by weight of a fire resistant latex. In particularly preferred embodiments the binder composition optionally further comprises about 0.1 to about 10 percent, more preferably about 0.1 to about 5 percent, by weight of the silica colloid based on the non-volatile weight of the resin. The cured binder composition has shown the ability to provide a bonded mineral wool/glass mat that passes the "Class B" ASTM rating (ASTM E84–87a) and is expected to provide a "Class A" ASTM rating with mineral fiber mats.

The combination of mineral fibers, glass fibers and the fire resistant binder contributes to the overall improved fire resistance of the mat while retaining desirable functional properties in the finished product.

Mats manufactured according to the present invention may be applied as a backing layer to plywood, gypsum, and other similar structural materials. Such mats may also be used as an underlayment between roofing materials such as cedar shakes and the plywood roofing deck, as a backing material for roofing products, and as a backing for carpeting and the like. Structures and building materials utilizing the fiber mat of the present invention will have demonstrated improvement in fire resistance.

DESCRIPTION OF THE PREFERRED EMBODIMENTS

The fire resistant mat of the present invention is comprised of a blended web of mineral wool fibers and monofilament glass fibers. Organic fibers may also be incorporated into the blend. The fibers are bonded together by a heat settable fire resistant binder. As detailed below, the binder has been formulated to improve its fire resistant properties. The combination of mineral wool fibers, glass fibers, and the fire resistant binder provides a mat with improved fire resistant properties.

FIBERS

Two or more different types of fibers are utilized in the preferred embodiment of the present invention. The first type of fibers are referred to as mineral wool fibers. These fibers are composed primarily of the oxides of silicon, aluminum, calcium and magnesium. The percentage of silicon dioxide is typically within the range of 35 to 50 percent. The blend of oxides results in mineral wool having highly fire resistant properties.

The fibers are produced according to well-known methods, such as fiberization through a spinning disk fiberizer. A wool fiber suitable for use with this invention is available from Bradford Eneroon, Inc., Grand Forks, British Columbia, and is sold under the trade name ENERWOOL. Depending upon the desired result, various sizing compounds may be added to the wool fibers.

The mineral wool fibers used in the preferred embodiment are of random length, but are generally within the range of about 0.6 cm to 7.6 cm, and preferably about 2.5 cm. Typically, these fibers are between 2 and 6 microns in diameter, but larger fibers would perform adequately with this invention.

Most mineral wool fiber is produced from raw materials such as iron blast furnace slag, copper refinery slag, or lead blast furnace slag. These raw materials are readily available, and mineral wool is therefore generally very economical to use.

Glass fibers are the second type of fiber used in the preferred embodiment of the present invention. Glass fibers consist primarily of oxides of silicon, but oxides of other minerals such as magnesium and aluminum are often present in relatively low concentrations. PPG Industries, Inc., Pittsburgh, Pa., manufactures glass fibers suitable for use with the present invention, and markets such fibers under the trade name CHOPPED STRAND.

The glass fibers used in the preferred embodiment of this invention are substantially uniform in length within a range of about 1.2 cm to 4.4 cm, and preferably about 1.9 cm in length. These fibers typically have an average diameter of between 10 and 20 microns, and preferably about 15 microns. Glass fibers known as K, L, and M filaments are readily available in the industry and fall within this range of dimensions.

The glass fibers improve the structural foundation of the finished mat by increasing its tear resistance and tensile strength, and also improve the folding and working qualities of the mat. Glass fibers are also relatively fire resistant, although they generally are not as highly fire resistant as mineral wool.

As noted, other types fibers may be incorporated into the blend of wool fibers and glass fibers, depending upon the desired properties of the finished mat. For example, organic fibers including but not limited to polyester, polyamide and cellulosics may be incorporated to alter the handling properties of the finished mat. The fire resistance of the mat having organic fibers incorporated therein will be generally maintained where the preferred ratio of wool fibers to glass fibers is maintained at the levels noted below.

The fire resistance of the mat is related to the ratio of wool fibers to glass fibers, and to the composition of the binder. The preferred ratio of wool fibers to glass fibers is about 9:1 (i.e., 90 percent wool fibers to 10 percent glass fibers on a dry weight basis), although acceptable mats have been produced with up to about 95 percent wool fibers. The preferred ratio has been found to produce a mat with a high degree of fire resistance and desirable functional and workable properties. However, a suitable fire resistant mat may be produced using a ratio of wool fibers to glass fibers of 1:1 (i.e., 50 percent wool fibers to 50 percent glass fibers on a dry weight basis). Of course, any ratio of wool fibers to glass fibers within this range would result in a suitable mat.

The ratio of wool, fibers to glass fibers also has a direct effect on the functional properties of the finished mat. In general, as the percentage of wool fibers is increased relative to the percentage of glass fibers, the finished mat tends to become more brittle, less foldable, and has decreased tensile strength. However, the fire resistance of the mat increases as the percentage of wool fibers increases. As discussed below, selection of a proper binder is important to offset these competing characteristics.

The functional properties of the finished mat are also affected by the dimensions of the fibers. Longer fibers and fibers having a large diameter will tend to produce a finished mat with a coarser hand. Conversely, shorter, smaller diameter fibers contribute to a mat having a relatively softer hand. Thus, both the ratio of wool fibers to glass fibers, and the dimensions of each of the fibers selected will affect the functional properties of the finished mat. The precise combination of fibers used in the mat depends upon the functional properties desired in the finished mat.

BINDER

The composition of the binder has a direct effect on both the fire resistance and the textural and folding properties of the mat. In the preferred embodiment the binder composition comprises a stable mixture of an aqueous aldehyde condensation polymer-based resin, a fire retardant latex and, optionally, an effective amount of an aqueous silica colloid, wherein the weight ratio of the latex to the resin is at least 1:1 on a non-volatile weight basis. The effective amount of silica colloid is an amount sufficient to enhance the flame resistant property of the binder composition after curing and yet remain compatible with the components of the binder composition prior to curing. The effective amount of the silica colloid preferably ranges from about 0.1 to about 10 percent by weight of the resin, more preferably from about 0.1 to about 5 percent by weight, non-volatile basis.

The proportions of the components of the binder composition may vary widely, but in a preferred embodiment proportions within the following approximate ranges which yield compatible or stable compositions, expressed as weight percentages of non-volatile materials, are satisfactory: about 5 to 50 percent aldehyde condensation polymer and 50 to 95 percent fire resistant latex, based on the weight on the polymer and latex. The composition also comprises from about 0.1 to about 10 percent silica colloid based on the weight of the aldehyde condensation polymer. More preferably, the proportions are preferred: about 20 to about 40 percent aldehyde condensation polymer and about 60 to about 80 percent latex, based on the weight of the polymer and latex, plus about 0.1 to about 5 percent silica colloid based on the weight of the aldehyde condensation polymer.

In another preferred embodiment of the binder, the silica colloid is optional and the aldehyde condensation polymer is a modified urea-aldehyde. The foregoing proportions for the latex and the resin would apply in this embodiment also. The silica colloid would range from 0 to about 10 percent by weight, preferably from 0 to about 5 percent by weight based on the weight of the aldehyde condensation polymer.

Other components such as antifoam agents, biocides, pH control agents, etc. may also be present in small proportions.

The total concentration of non-volatile components in the aqueous binder composition can vary widely, but will usually be found to make up this composition at total solids in the range from about 5 to about 40 percent by weight of the total aqueous composition. Total solids from about 20 to about 35 percent by weight are preferred.

Compatibility of the mixture relates to the ability of mixing the latex and the resin together without premature solids formation such as by precipitation or coagulation. Further, compatibility with respect to the silica colloid relates to water dilutability (at least 10 parts by weight of water per 1 part binder) of the binder composition such that "fish eyes" do not form and the silica does not phase separate from the resin forming a gummy material which will cause plugging in the application system. The level of compatibility of the binder composition's components is based on the balancing of the charge of the components. The charge problems encountered may be controlled during formulation and with proper pH control of the finished mixture.

Many of the aldehyde condensation polymers of phenol, resorcinol, urea, and melamine have been widely used as adhesives and their properties are well known. The aldehyde condensation polymers which can be used in this invention have reactive alkylol groups, and are well known and commercially available. These polymers may be cationic, anionic or nonionic, preferably nonionic. As earlier noted, a key constraint is compatibility of the resin with the latex. In this context, compatibility refers to the ability to mix the latex and the resin together without premature solids formations such as by precipitation or coagulation. "Polymers," as used herein, means resinous mixtures which do not crystallize or have a sharp melting point. Particularly, preferred polymers are those having "reactive alkylol groups" which are alkylol groups capable of reacting with ammonia or the amines used in this invention to modify the aldehyde condensation polymers. "Condensation" is used herein to mean a polymerization reaction in which a molecule, such as water, is eliminated and is to be distinguished from "addition" in which no by-product is formed. Further, the aldehyde condensation polymers used in this invention exclude those having dominant amide forming substituents.

Three classes of polymers are preferred: phenoplasts, aminoplasts, and ketone-aldehyde condensation polymers. They include such resins as the acid or base catalyzed phenol-aldehyde resins, urea-aldehyde resins, melamine-aldehyde resins, acetone-aldehyde resins, etc. The following references cited in U.S. Pat. No. 3,896,081 disclose methods of preparing the condensation resins useful in this invention: "The Chemistry of Synthetic Resins" by Carleton Ellis, Reinhold Publishing Co., 1935; "Phenolic Resin Chemistry" by N. J. L. Megson, Academic Press Inc., New York, 1958; "Aminoplasts" by C. P. Vale, Cleaver-Hume Press Ltd., London, England; and British Pat. No. 480,316. See also U.S. Pat. No. 4,794,051 (phenoplasts) and U.S. Pat. No. 4,169,914 (aminoplasts).

Specifically, the aldehyde condensation polymers which can be used include (1) phenoplasts comprising the condensation polymers of an aldehyde such as formaldehyde with a phenolic type material having at least two positions ortho and/or para to the hydroxyl group open for reaction, such as phenol, phenol-resorcinol, xylenol, cresol, resorcinol, and their derivatives, (2) aminoplasts comprising the condensation polymers of an aldehyde such as formaldehyde with compounds such as benzoguanamine, dicyandiamide, urea, melamine-urea, melamine, and their derivatives, and (3) ketone-aldehyde condensation polymers such as acetone-formaldehyde, methyl ethyl ketone formaldehyde, methylisobutyl ketone formaldehyde, and the like. The preferred resins are water-soluble, liquid, thermosetting urea-aldehyde resins, more preferably urea-formaldehyde resins. Urea-aldehyde resins are lower in smoke production, particularly if free monomer is less than 2 percent. Novolacs, because they lack reactive alkylol groups and lack water solubility, are not directly useful in this invention; they may be further reacted with aldehyde to convert them to useful resoles. Each of the aldehyde condensation polymers mentioned above is prepared and kept under conditions which prevent it from condensing to an infusible state by known methods.

The aldehyde used in preparation of the condensation polymer may be (1) monofunctional (i.e., a monoaldehyde), or (2) polyfunctional, having at least two aldehyde groups separated by at most one carbon atom, and can be, for instance, formaldehyde, paraformaldehyde, polyoxymethylene, trioxane, acrolein, and aliphatic or cyclic aldehydes such as glyoxal, acetaldehyde, propionaldehyde, butyraldehyde, and furfuraldehyde. Condensation, when using formaldehyde, furfuraldehyde, paraformaldehyde, polyoxymethylene or trioxane, is generally accomplished with the use of a mildly acid, alkaline, or no catalyst. When using acrolein, glyoxal, acetaldehyde, propionaldehyde, or butyraldehyde, condensation is generally accomplished by combining the reactants in the presence of a strongly acid catalyst, neutralizing the reaction product, adding more aldehyde, and further reacting in the presence of a mildly acid, or alkaline, catalyst. See generally U.S. Pat. No. 3,896,061.

The aldehyde condensation polymers mentioned above may be modified by reacting either the reactants during the condensation reaction or the condensation polymer after the condensation reaction with ammonia, preferably aqueous ammonia, or a primary polyamine, preferably a primary diamine, to yield a modified aldehyde condensation polymer. An example of the latter is disclosed in U.S. Pat. No. 3,896,081 to Baxter et al., which is incorporated herein by reference. Preferably, the modified aldehyde condensation polymer is produced by reacting the reactants during the condensation reaction with the ammonia or a primary polyamine, preferably an alkyl primary diamine, more preferably a $C_1$–$C_6$ alkyl primary diamine, for example ethylene diamine. The ammonia may be aqueous ammonia or anhydrous ammonia.

The weight ratio of the aldehyde condensation polymer to the latex in the binder composition is greater than or equal to 1:1 on a non-volatile basis. Accordingly, the latex ranges from 50 to about 95 percent by weight and the aldehyde condensation polymer ranges from about 5 to 50 percent by weight based on the weight of the latex and the aldehyde condensation polymer. The silica colloid ranges from about 0.1 to about 10 percent by weight based on the weight of the resin (aldehyde condensation polymer) on a non-volatile basis.

The aldehyde condensation polymer-based resin of the binder composition are also commercially available materials, for example, urea-formaldehyde resins such as the types sold by Georgia Pacific Resins, Inc., Atlanta, Ga. (such as GP-2904 and GP-2914), sold by Borden Chemical Company, Columbus, Ohio, and sold by Neste' Resins Corporation, Eugene, Oreg., for glass mat application may be used. These resins generally are modified with methylol groups which upon curing form methylene or ether linkages. Such methylols may include N,N'-dimethylol; dihydroxymethylolethylene; N,N'-bis(methoxymethyl), N,N'-dimethylolpropylene; 5,5-dimethyl-N,N'-dimethylolpropylene; N,N'-dimethylolethylene; N,N'-dimethylolethylene and the like.

The fire resistant latex used in the invention is an aqueous emulsion of a thermoplastic polymer (latex), which is halogenated and preferably also carboxylated. The thermoplastic polymers useful in the present invention include homopolymers of vinyl chloride and vinylidene chloride and copolymer of vinyl chloride and vinylidene chloride with each other or separately with comonomers such as olefins, vinyl acetate, vinyl esters such as vinyl propionate and vinyl butyrate, as well as alkyl-substituted vinyl esters. Additionally, copolymers of vinyl chloride or vinylidene chloride with acrylic comonomers such as acrylic acid, methacrylic acid, and the alkyl esters thereof, may be useful in the present invention. Examples of such latex polymers are carboxylated vinylidene chloride/butadiene emulsion polymers and ethylene/vinyl chloride emulsion polymers.

While these resins may be emulsified with any emulsifying agent compatible with other components of the composition, anionic surfactant are preferred. Suitable emulsified ethylene-vinylchloride polymers are AIRFLEX 4500, 4514 and 4530, Dow 249, and Geon® 460×58 and 460×63. (AIRFLEX is a registered trademark of Air Products and Chemicals, Inc. and Geon® is a registered trademark of B. F. Goodrich Co.). These AIRFLEX polymers contain small proportions of amide functionality, have particle sizes from about 650 to 900 angstroms, are emulsified with an anionic surfactant and have a very slightly alkaline Ph. Another suitable vinyl resin is the vinyl acetate/vinyl chloride copolymer dispersion resin commercially available from the Occidental Chemical Corporation under the trade designation Oxy 565. A suitable emulsified carboxylated vinylidene chloride/butadiene polymer is Dow DL249NAC available from Dow Chemical which contains a bactericide and antioxidant (45–50 percent polymer, 50–55 percent water). Other vinylidene chloride interpolymers are disclosed in U.S. Pat. No. 4,457,969, which is hereby incorporated by reference.

Any of the commercially available aqueous silica colloids (emulsions) should be useful as the third component of the binder composition, including non-ionic, anionic and cationic silica colloids, preferably cationic silica colloids. Water dispersible silica gels may also be used in lieu of or in combination with silica colloids. Again, the key constraint is compatibility of the colloid with the latex and resin.

Not wishing to be bound to any particular theory, it is believed the silica colloid provides an inorganic type of binder to assist the organic polymers in the binding of the fibers in the final phase of organic burnoff. The silica colloid is deposited on the fiber surface and fiber junction matrix and provides an inorganic bond between fibers. The nature of the inorganic bond, whether a chemical bond or physical phenomena, is presently unknown. Although low in concentration with respect to the overall binder content, this additive appears to contribute to the retention of mat integrity under direct forced flame conditions.

The cationic colloidal silica is an aqueous dispersion of positively charged colloidal particles consisting of a dense silica core coated with a positively charged polyvalent metal-oxygen compound typically stabilized with a counterion.

Suitable cationic colloidal silica materials include those of U.S. Pat. Nos. 3,007,878, 3,252,917, 3,620,978, 3,719,607 and 3,956,171, which are all incorporated herein by reference. These are aqueous dispersions of positively charged colloidal particles consisting of a dense silica core coated with a positively charged polyvalent metal-oxygen compound, e.g., of the class consisting of metal oxides, metal hydroxides and hydrated metal oxides of metals having a valence of 3 or 4, preferably aluminum and titanium. Most preferably, the dispersion is acidic, and the coating is of polymeric alumina species. Typically, the mole ratio of aluminum to silica on the surface is about 1:1, and the dispersion (which has been commercially available as Ludox Positive Sol 130M, from E. I. Du Pont de Nemours & Co.) is stabilized with a counterion, as described in the aforesaid U.S. Pat. No. 3,007,878. The dispersion has been supplied at 30 percent solids, stabilized with chloride ion (1.4 percent as NaCl) for use in the pH range 3.5 to 5.5. Another suitable cationic colloidal silica is Nalco® 1SJ–612 available from NALCO Chemical Co., Naperville, Ill. Others are Ludox HS, a sodium stabilized colloidal silica; and Ludox AM, a stabilized cationic colloidal silica or silica sol; both marketed by Du Pont.

The colloidal particles exhibit a surface area of about 150–225 $m^2/g$ by nitrogen absorption, a particle diameter of about 15–16 microns, and a molecular weight of about 5 to 18 million by light scattering.

These are examples of water dispersed colloids. These silica colloids can be considered polymers, and they interact when mixed to form colloidal aggregate particles of low surface charge which surround the internal phase droplets in quite the same manner as the particles formed by the interaction of the soluble anionic and cationic emulsifying agents. See U.S. Pat. No. 4,592,859.

Additional ingredients can be formulated into the latex to aid in processing and to vary the end-use properties of the fibrous mat. For example, surfactants may be utilized to assist the latex in wetting and penetrating the mat of fibers. Thickeners may be utilized to increase the viscosity of the latex and thereby limit strike-through of the latex. Film-forming aids, including both volatile and non-volatile organic solvents, for the vinylidene chloride interpolymer may be incorporated into the latex. Defoamers are useful to assist in processing. Mildewcides and/or fungicides may provide stabilities toward degradation of the end product.

In particular, it may be desirable to increase the fire resistance of the mats utilizing the binder composition of the instant invention by incorporating fire-resistant pigments and salts and/or organic compounds having fire-resistant properties into the latex. Examples of such pigments include titania, silica, etc. A preferred pigment is antimony oxide which may impart synergistic fire-resistant properties to flammable materials when utilized in conjunction with the fire resistant latexes utilized herein, such as the vinylidene chloride interpolymer. Many salts and organic compounds are known to impart fire-resistance to flammable materials. For example, phosphorus, in a salt or in an organic compound, is a well known fire retarding agent. Thus, ammonium, alkali metal, and alkaline earth metal phosphates and polyphosphates may be combined in the above latex. Organophosphorus esters are known plasticizers for many polymers and therefore may be combined in the above latex, such as vinylidene chloride interpolymers to provide or increase fire-resistance, with the additional effect of plasticizing the vinylidene chloride interpolymer. Finally, halogen-containing salts and compounds are useful fire retardants; therefore, brominated organics and chlorinated waxes may be combined with the coatings for additional fire resistance.

The binder composition of the present invention may be prepared by combining the aqueous aldehyde condensation polymer-based resin, the flame resistant latex, and optionally the silica colloid and other optional components in any order. Preferably the silica colloid is added to the aldehyde condensation polymer and this mixture is then added to the latex emulsion.

The binder composition sets or cures at elevated temperatures below the decomposition temperature of the resin and the latex. The setting or curing of the binder composition occurs at temperatures from about 135° C. to about 300° C., and preferably from about 135° C. to about 275° C. At these temperatures the binder composition will typically solidify in periods ranging from about 2 to about 25 seconds. Although solidification of the binder composition may occur more rapidly at higher temperatures, excessively high temperatures can cause deterioration of the binder composition or the fibers of the mat, which in turn causes a deterioration of the bonded mat[3 s physical and functional properties.

PRODUCTION OF THE MAT

Turning to the production of the mat, non-woven fiber mats, including a mat prepared according to the present invention, are typically manufactured by a process known as the "wet" process. This process is well known in the art, and is typified by the disclosure in U.S. Pat. No. 4,129,674.

By way of illustration, and not limitation, an aqueous slurry is formed which includes the wool fibers and the glass fibers. Both the wool and the glass fibers are preweighed, then metered into a slurry or mix tank in a conventional manner. The slurry or mix tank contains a predetermined amount of water, and also typically contains a viscosity modifier and a fiber dispersant. NALCO 2386, sold by NALCO, Chicago, Ill., has been found to be a satisfactory viscosity modifier, and Katapol VP532, sold by Rhone Poulenc, is a satisfactory fiber dispersant. The percentage of fiber in the slurry is preferably quite low, typically around 0.2 percent, but a range of about 0.1 percent to about 0.5 percent fibers in the slurry is acceptable. The slurry is actively agitated in the slurry tank. The combined action of the agitation and the viscosity modifier and dispersant ensures that the wool fibers and the glass fibers are randomly and completely dispersed throughout the slurry.

After the fibers are thoroughly dispersed in the slurry tank, the slurry is pumped into a section of the processing line known as a head box. A continuously moving porous screen, known as the forming wire, moves through the head box. The fibers are deposited on the forming wire in a continuous membrane as the screen moves through the slurry. Most of the water passes through the screen, leaving the fibers in a continuous, randomly oriented, non-woven membrane on the screen. A vacuum located immediately downstream thereafter removes a majority of water from the membrane. The water which is removed by vacuum typically is recycled through the system.

The continuous membrane of fibers is then transferred to a second screen for conveyance through the section of the processing line where the binder is applied. The amount of the binder used in the fibrous mat is in the range of about 3 to about 45 percent by weight of the bonded mat, preferably about 10 to about 30 percent by weight. If the amount of the binder is too great, the porosity and strength of the mat could be adversely affected, and, if the amount is too low, the integrity of the mat could be adversely affected. The liquid binder composition of the present invention may be applied to the fibers comprising the mat by any coating and/or impregnating method known to the art which is convenient in the circumstances. Thus, the liquid binder composition may be sprayed onto the fibers during their deposition onto the mat or onto the mat itself. Another method, which minimizes the escape of binder into the workplace environment and also provides the possibility for conveniently recovering and recirculating excess liquid binder, is to flow-coat or immerse the unbonded mat in a bath of the liquid binder composition or to flood the unbonded mat with the liquid binder composition, in either case straining off by gravity, but preferably under vacuum, excess liquid binder composition, if any, which may be recovered and recycled. For example, binder may be applied to the top and bottom of the membrane in a conventional manner. Typically, the top of the membrane is coated with binder by means of a curtain coater and the bottom of the membrane is coated by way of surface contact. Enough binder is applied to the membrane to completely saturate the fibers. A second vacuum, located downstream of the curtain coater, then removes excess binder. Generally, the amount of binder remaining in the membrane after this vacuuming process is within the range of about 15 to about 30 percent by weight of the wet membrane, for example, about 20 percent by weight.

Typically, the mat is then heated to an effective temperature to set or cure the binder composition. This can be accomplished with can dryers or any one or more drying devices used in the art. For example, the binder-saturated membrane may be transferred onto another porous metal screen for conveyance through a tunnel oven. The heat of the oven is maintained at a temperature within the range from about 135° C. to about 300° C., preferably about 135° C. to about 275° C., and more preferably from about 175° C. to about 260° C. For example, at about 205° C., the mat is heated at this temperature for about 55 seconds. After the mat is conveyed out of the oven, it is wound into a roll. The rolled mat may then be used for further processing.

The cured binder-containing fibrous mat has good strength and tensile properties such as wet and dry tensile strength and tear strength to be used as a base or supporting layers in roofing products and other products where a good strength mat is required along with good rot resistance. A Class A fire rating is also attainable.

Example No. 1

A fire resistant mat made in accordance with the present invention was produced by the following method:

530 pounds of mineral wool fiber was mixed with 50 pounds of glass fiber in approximately 30,000 gallons of water. 50 gallons of a viscosity modifier (NALCO 2386) and 300 ml. of fiber dispersant (Katapol VP532) were added to the slurry. The slurry was actively mixed for approximately 15 minutes to completely disperse the fibers. The slurry was then pumped into the head box for depositing on a continuous forming wire. The fibers were deposited in a continuous membrane on the forming screen, with most of the water passing directly through the screen. The continuous membrane was immediately thereafter subjected to vacuum dewatering to remove excess water.

The continuous membrane on the forming screen was then transferred to a binder screen. The binder screen carried the web through a binder section where the binder was allowed to saturate the top of the mat via a curtain coater and the bottom of the mat by surface contact.

Two separate resin formulations were tested:

RESIN COMPOSITION NUMBER 1: Ammonia Modified Aldehyde Condensation Polymer

An ammonia-modified aldehyde condensation polymer was prepared as follows. Where pH adjustment is noted in the following, a sodium hydroxide solution (25 percent NaOH in water) and/or a sulfuric acid solution (7 percent $H_2SO_4$ in water) is used as necessary. The following ingredients were placed in a kettle reactor in about the following amounts:

2.5 parts water 58.6 parts formaldehyde solution (52 percent formaldehyde in water), the reactor was equipped with a temperature controller, an agitator, and heating and cooling coils. As shown in Example 2 infra., urea-formaldehyde concentrates are preferably utilized. Such concentrates are commercially available and preferred from an economic standpoint as less water needs to be added and removed. The pH was adjusted to about 4.7–4.9. Then about 8.8 parts of ammonium hydroxide solution (28 percent $NH_4OH$ in water) was charged in less than about 25 minutes. Heat was applied to obtain a temperature of about 75° C. and held at that temperature for about 5 minutes. The pH was adjusted to at least about 8.0. The reactor contents were then cooled to less than about 55° C. About 29 parts of urea prill were added thereto while continuing to cool and maintaining a temperature between about 20° C. and about 35° C. Urea pellets or shot may also be used. While mixing to dissolve the urea, the reactants were heated to about 40° C. The pH was adjusted to at least 8.8. The reactants were then heated to about 97° C. over about a 30 minute period, while maintaining a pH of at least about 6.6. The temperature was then held at this level for about 15 minutes maintaining a pH of at least about 6.0. The reactor contents were then rapidly cooled to about 85° C. and held there until a Gardner-Holdt viscosity of "A" was achieved (about 45 minutes). Upon achieving an "A" viscosity, the reactor contents were cooled to about 65° C. and held at that level until a viscosity of "D" was achieved (about 20 minutes). During these two time periods, the pH was maintained at a pH of at least about 4.7. Thereafter, the pH was adjusted to a pH ranging from about 7.7 to about 8.0, while adjusting and maintaining the temperature to about 60° C. A vacuum was applied to the reactor and about 11 percent of the in-kettle batch weight was distilled as rapidly as possible. The viscosity was about "KL". After cooling to about 25° C., about 1 part triethylamine sulfate (as a latent catalyst; also known as N,N-diethylethane amine sulfate) was added to the reactor contents. After about 10 minutes of mixing, the pH was adjusted to about 8.0. The final product had a refractive index at 25° C. of about 1.45.

RESIN COMPOSITION NUMBER 2: AMMONIA-MODIFIED ALDEHYDE CONDENSATION POLYMER WITH SILICA COLLOID

An ammonia-modified aldehyde condensation polymer was prepared as follows. Where pH adjustment is noted in the following, a sodium hydroxide solution (25 percent NaOH in water) and/or a sulfuric acid solution (7 percent $H_2SO_4$ in water) was used as necessary. The following ingredients were placed in a kettle reactor in about the following amounts:

0.05 parts water 35.7 parts formaldehyde solution (52 percent formaldehyde in water), 28.5 parts urea-formaldehyde concentrate (about 23 percent urea, 53 percent formaldehyde, 24 percent water; F to U mole ratio is about 4.6:1), the reactor was equipped with a temperature controller, an agitator, and heating and cooling coils. Urea-formaldehyde concentrates with lower amounts of water are also commercially available and preferred from an economic standpoint as less water needs to be removed. The pH was adjusted to about 4.7–5.0. Then about 8.9 parts of ammonium hydroxide solution (28 percent $NH_4OH$ in water) was charged in less than about 25 minutes. Heat was applied to obtain a temperature of about 75° C. and held at that temperature for about 5 minutes. The pH was adjusted to at least about 8.0. The reactor contents were then cooled to less than about 55° C. About 23.8 parts of urea prill were added thereto while continuing to cool and maintaining a temperature between about 20° C. to about 35° C. Urea pellets or shots may also be used. While mixing to dissolve the urea, the reactants were heated to about 40° C. The pH was adjusted to at least 8.8. The reactants were then heated to about 97° C. over about a 30 minute period, while maintaining a pH of at least about 6.6. The temperature was then held at this level for about 15 minutes maintaining a pH of at least about 6.0. The reactor contents were then rapidly cooled to about 85° C. Upon reaching 85° C., about 0.13 parts of sulfuric acid solution was added below the surface while continuing to mix. The reactor contents were then held at about 85° C. until a Gardner-Holdt viscosity of "A" was achieved (about 60 minutes). Upon achieving an "A" viscosity, the reactor contents were cooled to about 70° C. and held at that level until a viscosity of "L" was achieved. During these two time periods, the pH was maintained at a pH of at least about 4.8 (about 30 minutes). Thereafter, the pH was adjusted to a pH ranging from about 7.8 to about 8.3, while adjusting and maintaining the temperature to about 60° C. Then about 0.73 parts of urea prill was added to the reactor contents in less than 20 minutes. The temperature was then held at about 60° C. for about 10 minutes and then rapidly cooled to about 25° C. After cooling to about 35° C. during this cooling procedure, about 1 part triethylamine sulfate (as a latent catalyst) was added to the reactor contents. Thereafter, about 1.1 parts of cationic silica colloid (NALCO® 1SJ-612, an aluminum oxide coated silica sol with a particle size of about 20 nanometer; available from Nalco Chemical Co., Naperville, Ill.) and mixed for about 5 minutes. After about 10 minutes of mixing, the pH was adjusted to about 8.1. The final product had a refractive index at 25° C. of about 1.448 with a viscosity of "G-K", about 55 percent non-volatiles by refractive index and a water dilutability greater than 10:1. If desired, the silica colloid may be added later when formulating the binder composition.

Immediately after the binder was applied to the membrane, excess binder was removed by a vacuum, leaving approximately 20 percent binder by weight in the web.

The web was then transferred onto a porous metal screen and conveyed through a tunnel oven. The oven was set at about 205° C. The retention time in the oven was about 55 seconds. The heat in the tunnel oven cured the binder and evaporated excess water. The dried mat was transferred to a dry screen from which it was wound into a continuous roll on a winder.

FIRE RESISTANCE TESTS

The various bonded mats were prepared and tested in accordance with the procedures outlined in the American Society for Testing and Materials (ASTM) Test method E8487a. This test method is also described by ANSI 2.5, NFPA 255, UL723, UBC 42-1 and UL 1256. The purpose of this test is to determine the burning characteristics of the material under test by evaluating the flame spread over its surface and the density of the smoke developed when exposed to a test fire. This will then develop a basis on which the surface burning characteristics of different materials may be compared.

In this ten minute test, a material is exposed to a calibrated flame which will produce a flame spread along the entire length of a red oak flooring calibration specimen in 5.5 minutes. By past methods of calculating Flame Spread Index (FSI) this meant that red oak flooring had an FSI of 100. However, the FSI equations were modified in 1979 resulting in red oak having an FSI of about 91. The Smoke Developed index value for red oak remains unchanged at 100. The FSI and Smoke Developed test results of a material are compared with those of red oak previously discussed and those of asbestos-cement board where FSI and Smoke Development values are zero.

The FSI and Smoke Developed results are frequently used by building code officials and regulatory agencies for determining the acceptance of building materials used in various applications. The most widely accepted classification system for use of these tunnel results is found in the National Fire Protection Association Life Safety Code, NFPA 101 which indicates the following:

Class A: 0 to 25 FSI

Class B: 26 to 75 FSI

Class C: 76 to 200 FSI

Class D: 201 to 500 FSI

Class E: Over 500 FSI

The accepted premise is that the higher the Flame Spread Index, the greater the fire hazard although the relationship between the numbers developed under this test and life safety in fire have not been adequately established.

Six bonded mat compositions denoted Samples I through VI, respectively, were prepared and tested. The unbonded mats were a mixture of mineral wool and glass fibers and were prepared using a wet-laid process. The unbonded mats were then saturated with the binder composition, dried and heat cured on a wet process glass mat machine. The bonded mats had approximately 75 percent weight fiber and 25 percent by weight cured binder The resins used in preparing the various binder compositions were the resin prepared in Resin Composition No. 1 (Ex. 1), and the resin containing silica colloid prepared in Resin Composition No. 2. (Ex. 1)

The latexes used in preparing the various binder compositions were DOW DL249NAC (D249), an emulsified carboxylated vinylidene chloride/butadiene polymer available from DOW Chemicals, and AIRFLEX 4530 (A4530), an emulsified ethylene/vinyl chloride polymer available from Air Products and Chemicals, Inc., Allentown, Pa.

One set of test samples consisting of three 21 inch by 96 inch by ½ inch 5-ply plywood was prepared for each mat, except for Sample I which used a nominal 7/16 inch Oriented Strand Board (OSB) instead of ½ inch 5-ply plywood. The test samples were faced on one side with the respective bonded mat. Prior to testing, the Samples were conditioned at 50° RH and 70° F. The bonded mat compositions and corresponding test results are given in Table 1.

TABLE 1

| | FIBER[a] | BINDER COMPOSITION[b] | | | FIRE RESISTANCE TEST[e] | | |
|---|---|---|---|---|---|---|---|
| Sample | (Wool Glass) | Latex/ Wt. % | Resin/ Wt. % | Silica Yes/No | Mat Basis Weight[c] | FSI | SDI |
| I | 90/10 | D249/100 | — | No | 4(175) | 85 | 315 |
| II | 80/20 | D249/75 | Ex. 1/25 | No | 4.6(200) | 30 | 145 |
| III | 80/20 | A4530/75 | Ex. 1/25 | No | 4.6(200) | 40 | 185 |
| IV | 80/20 | D249/75 | Ex. 1/25 | No | 4.6(200) | 40 | 140 |
| V | 80/20 | D249/80 | Ex. 2/20 | Yes | 6(260)[d] | 30 | 70 |
| VI | 80/20 | D249/80 | Ex. 2/20 | Yes | 4(175) | 40 | 25 |

[a]Weight ratio of mineral wool fibers to glass fibers (weight percent/weight percent)
[b]Latexes and resins are described above in this example; Wt. % is weight percent; "Silica (Yes/No): indicates the presence or absence of silica colloid in the binder composition.
[c]Pounds per 100 square feet (grams per square meter)
[d]Two layers of mat, each mat weighing approximately 3 pounds per 100 square feet.
[e]Sample I used nominal 7/16 inch OSB and Samples II–VI used ½ inch 5-ply plywood.

a. Weight ratio of mineral wool fibers to glass fibers (weight percent/weight percent)
b. Latexes and resins are described above in this example; Wt. % is weight percent; "Silica (Yes/No): indicates the presence or absence of silica colloid in the binder composition.
c. Pounds per 100 square feet (grams per square meter)
d. Two layers of mat, each mat weighing approximately 3 pounds per 100 square feet.
e. Sample I used nominal 7/16 inch OSB and Samples II-VI used ½ inch 5-ply plywood.

During the testing of Sample II, at the burner end of the test tunnel, the mat buckled and wrinkled in the high heat areas. Two test result properties were collected during this run: Flame Spread Index (FSI) and Smoke Development Index (SDI), which were 40 and 185 respectively. The targeted FSI for a Class A rating is 25. A low SDI would allow improved vision in a smoke filled environment. Though the Sample II test results demonstrate a need for improvement, these results were a significant improvement over Sample I which had an FSI of 85 and an SDI of 315.

Samples III and IV were prepared using different embodiments of the binder composition of the present invention to compare the effects of two different latexes in these binders. Both mat samples were bonded with a 25 percent/75 percent mixture of the resin of Ex. 1 and a latex emulsion, either A4530 or D249. The bonded fiber mat was overlaid on ½" plywood and subjected to the ASTM Test Method E 84–87a. The basis weights of the test specimen were approximately 200 grams per square meter (4.6 pounds per 100 square feet). In both test runs, the mat slightly sagged away from the plywood in the high heat area. Sample III with the A4530 provided a Flame Spread Index (FSI) of 40 and a Smoke Development Index (SDI) of 185. Sample IV with the D249 provided an FSI of 40 and an SDI of 140. The 40 FSI achieved a Class B, 26–75, National Fire Protection Association Life Safety Code, NFPA 101, with a Class A, 0–25, the targeted goal. A low SDI would allow improved vision in a smoke filled environment. It was concluded that the Class A rating could be achieved with these binder composition embodiments if the basis weight of the mat were increased from the 200 grams per square meter to 260 grams per square meter.

Sample V provided a FSI of 30 and an SDI of 70. The FSI level of 30 was achieved with an embodiment of the improved binder composition of the present invention, resin of Ex. 2 and D 249, an increase in the mat facer basis weight with two layers of mat instead of one in an attempt to evaluate the basis weight of approximately 260 grams per square meter. The two layer concept although sound allowed the burner flame to separate the mat layers and influence the final test results. It was concluded that the Class A rating could be achieved with a single mat web bonded with the same binder composition with a basis weight of 260 grams per square meter.

Sample VI provided a FSI of 40 and an SDI of 25. The FSI level of 40, comparable to that of Samples III and IV, was achieved with an embodiment of the improved binder composition of the present invention containing silica colloid at a lower mat facer basis weight (175 grams versus 200 grams per square meter). Samples V and VI show a significant reduction in SDI over Samples II–IV which is in part due to the presence of the silica colloid.

Based on the fire tunnel testing conducted on the two layer mat, which was bonded with a 20% of the silica colloid-containing urea-formaldehyde resin on Ex. 2/80 percent D249 latex emulsion mix, a single layer mat with the basis weight of about 260 grams per square meter or about 6 pounds per square foot would be expected to pass the ASTM E 84–87a Class A Rating of 0–25.

Having described and illustrated the principles of our invention with reference to a preferred embodiment and several variations thereon, it should be apparent that the invention can be modified in arrangement and detail without departing from its principles. Accordingly, we claim all modifications as may come within the scope and spirit of the following claims:

We claim:

1. A non-woven fibrous mat having enhanced fire resistance and having a class A (0 to 25 FSI) rating under NFPA 101, comprising:

a non-woven blend of fibers including at least mineral fibers and glass fibers in a mat, the mineral fibers comprising between fifty percent (50%) and ninety-five percent (95%) by weight of the blend, and a stable, fire resistant thermosetting binder, the binder comprising a mixture of (a) a fire retardant halogenated carboxylated latex and;

(b) a modified aldehyde condensation polymer resin that is prepared from reacting urea, an aldehyde and a modifying agent selected from the group consisting of aqueous ammonia, anhydrous ammonia, a primary polyamine and combinations thereof during the condensation reaction, wherein the weight ratio of the latex to the resin is at least 1:1 on a non-volatile weight basis.

2. The fibrous mat according to claim 1 wherein the binder includes an aqueous silica colloid in an amount effective to enhance mat integrity under forced flame conditions.

3. The fibrous mat according to claim 2 wherein the silica colloid is present in an amount within the range of 0.1 to 10 percent by weight of the aldehyde condensation polymer.

4. The fibrous mat according to claim 1 wherein the aldehyde condensation polymer is reacted with a primary polyamine during the condensation and wherein the polyamine is an alkyl primary polyamine.

5. The fibrous mat according to claim 4 wherein the alkyl primary polyamine is a C1–C6 alkly primary diamine.

6. The fibrous mat according to claim 2 wherein the silica colloid is cationic.

7. A non-woven fiber mat having a Class A (0 to 25) rating under NFPA 101, comprising:
 a blend of mineral fibers and glass fibers wherein the mineral fibers comprise between fifty percent (50%) and ninety-five percent (95%) by weight of the blend, the fibers bonded together with a stable binder comprising:
 (a) a fire retardant halogenated carboxylated latex selected from the group consisting of homopolymers of vinyl chloride and vinylidene chloride and copolymers of vinyl chloride and vinylidene chloride;
 (b) a modified aldehyde condensate prepared by reacting urea, an aldehyde and a modifying agent selected from the group consisting of aqueous ammonia, anhydrous ammonia, a primary polyamine and combinations thereof during the condensation reaction;
 wherein the weight ratio of the latex to the resin is at least 1:1 on a non-volatile weight basis.

8. The fiber mat according to claim 7 including a silica colloid in the binder in an amount effective to enhance the fire resistance of the mat and remain compatible with the remaining components of the binder.

9. A non-woven fibrous mat, comprising:
 a blend of fibers including at least mineral fibers and glass fibers, the mineral fibers comprising between 50 percent and 95 percent by weight of the blend;
 a binder for impregnating and coating the fibers and for bonding the fibers together when cured, the binder comprising a stable mixture of
 (a) a fire resistant latex;
 (b) a thermosetting aldehyde condensation polymer, and an effective amount of aqueous silica colloid to enhance the fire retardant properties of the cured binder and yet remain compatible with the other components of the binder composition prior to curing,
 wherein the weight ratio of the latex to the aldehyde condensation polymer is at least 1:1 on a non-volatile weight basis.

10. The mat according to claim 9, wherein the binder further comprises
 a stable mixture of 50 to about 95 percent of the fire resistant latex based on the weight of the polymer and latex,
 about 5 to 50 percent by weight of the aldehyde condensation polymer based on the weight of the polymer and latex, and
 the effective amount of silica colloid, wherein the weight percentages are based on non-volatile materials.

11. The mat according to claim 9 wherein the fire resistant latex is a halogenated latex polymer.

12. The mat according to claim 11, wherein the halogenated latex polymer is a carboxylated halogenated latex polymer.

13. The mat according to claim 9, wherein the aldehyde condensation polymer is a urea-aldehyde condensate.

14. The mat according to claim 13, wherein the urea-aldehyde condensate is a modified urea-aldehyde condensate prepared by reacting urea, an aldehyde and a modifying agent selected from the group consisting of aqueous ammonia, anhydrous ammonia, a primary polyamine and combinations thereof during the condensation reaction.

15. The mat according to claim 14, wherein the modified urea-aldehyde condensate is a modified urea-formaldehyde condensate.

16. The mat according to claim 14, wherein the modifying agent is aqueous ammonia.

17. The mat according to claim 14, wherein the modifying agent is a primary polyamine.

18. The mat according to claim 17, wherein the primary polyamine is an alkyl primary diamine.

19. The mat according to claim 18, wherein the alkyl primary diamine is a $C_1$–$C_6$ alkyl primary diamine.

20. The mat according to claim 9, wherein the silica colloid is a cationic silica colloid.

21. The mat according to claim 9, wherein the effective amount of silica colloid is in the range from about 0.1 to about 10% by weight based on the weight of the aldehyde condensation polymer, on a non-volatile materials basis.

22. The mat according to claim 9, wherein the binder comprises:
 a stable mixture of
 about 60 to about 80% by weight of the fire resistant latex, and
 about 20 to about 40% by weight of the aldehyde condensation polymer, based on the weight of the latex and the aldehyde condensation polymer, and
 about 0.1 to about 10% by weight of the silica colloid, based on the weight of the aldehyde condensation polymer, on a non-volatile materials weight basis.

* * * * *